US007149705B1

(12) United States Patent  (10) Patent No.: US 7,149,705 B1
Haruki et al.  (45) Date of Patent: Dec. 12, 2006

(54) COMPUTER-RELATED PRODUCT USER MANAGEMENT AND SERVICE SYSTEM

(75) Inventors: Hiroshi Haruki, Kawasaki (JP); Toshiko Nagayama, Kawasaki (JP); Eiichi Hattori, Kawasaki (JP); Tadashi Akutagawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 503 days.

(21) Appl. No.: 08/971,903

(22) Filed: Nov. 17, 1997

(30) Foreign Application Priority Data

Feb. 28, 1997 (JP) ................... 9-046008

(51) Int. Cl.
G06Q 30/00 (2006.01)
(52) U.S. Cl. ...................... 705/14; 717/171
(58) Field of Classification Search ............ 705/1, 705/22, 28; 717/11
See application file for complete search history.

(56) References Cited

U.S. PATENT DOCUMENTS

| 5,014,234 | A | * | 5/1991 | Edwards, Jr. ............... 713/200 |
| 5,351,186 | A | * | 9/1994 | Bullock et al. ............... 705/1 |
| 5,490,216 | A | * | 2/1996 | Richardson, III ............. 380/4 |
| 5,579,222 | A | * | 11/1996 | Bains et al. ................ 395/712 |
| 5,625,690 | A | * | 4/1997 | Michel et al. ............... 705/53 |
| 5,745,766 | A | * | 4/1998 | Bramnick et al. ........... 395/703 |
| 5,745,879 | A | * | 4/1998 | Wyman ......................... 705/1 |
| 5,761,649 | A | * | 6/1998 | Hill ............................ 705/27 |
| 5,764,992 | A | * | 6/1998 | Kullick et al. .............. 395/712 |
| 5,806,043 | A | * | 9/1998 | Toader ........................ 405/14 |
| 5,845,077 | A | * | 12/1998 | Fawcett ...................... 709/221 |
| 5,867,714 | A | * | 2/1999 | Todd et al. .................. 717/11 |
| 6,049,671 | A | * | 4/2000 | Slivka et al. ................. 717/11 |
| 6,073,214 | A | * | 6/2000 | Fawcett ...................... 711/133 |
| 6,230,199 | B1 | * | 5/2001 | Revashetti et al. .......... 709/224 |
| 6,233,536 | B1 | * | 5/2001 | Zale et al. ................... 702/188 |

FOREIGN PATENT DOCUMENTS

WO  WO 95/34857  * 12/1995

OTHER PUBLICATIONS

Goldsborough, Reid, "Cyberguide: Software: Getting the Support You Deserve", NetGuide, v3, n10, p. 103-106, Oct. 1, 1996.*
Dyszel, Bill, "Oil Change Tunes Up Your PC", Window Sources, v4, n10, p. 86, Oct. 1, 1996.*
Gralla, Preston, "Tune Up Your OC Online", PC/Computing, v9, n12, p. 150d, Dec. 1, 1996.*

(Continued)

Primary Examiner—Eric Stamber
Assistant Examiner—John Van Bramer
(74) Attorney, Agent, or Firm—Staas & Halsey LLP

(57) ABSTRACT

A user information general management unit for generally managing user registration information and using status information transmitted from a user side of a computer-related product is provided at a system manager side, for example, a user registration centre. A user registration/reference unit for notifying the user information general management unit of the user registration information and the using status information at a request from the user, and for requesting new information provided from a vendor side about a computer-related product is provided on a user side. With this configuration, a user registration operation can be simple on the user side, the time and the cost required in checking the using status on the vendor side can be reduced, and an appropriate service for a user can be realized.

18 Claims, 28 Drawing Sheets

OTHER PUBLICATIONS

Miastkowski, Stan, "Oil Change Automates Your OC Maintenance", PC World, v14, n12, p. 106, Dec. 1, 1996.*

Peschel, Joe, "Lubricate Your System With Oil Change", InfoWorld, v18, n51, p. 93, Dec. 16, 1996.*

Miastkowski, Stan, "Rx For Your PC:...", PC World, v15, n1, p. 54, Jan. 1, 1997.*

Bisson, Giselle, "CyberMedia secures major licensing agreement with Sony for Oil Change software", M2Presswire, pp. 12-15, Jan. 1997.*

Bisson, Giselle, "CyberMedia secures major licensing agreement with Sony for Oil Change software", M2Presswire, pp. 12-15.*

* cited by examiner

| PERSONAL AUTHENTI-CATION ID | PASSWORD | NAME | READING | POST CODE | ADDRESS | TELEPHONE NUMBER | E-MAIL | CORPORATION/PERSON | GENDER | BIRTHDAY |
|---|---|---|---|---|---|---|---|---|---|---|
| HHHXXX001 | ****** | HANAKO EBISU | HANAKO EBISU | 150 | SHIBUYA, TOKYO.... | 03- | | PERSON | F | 1965.02.04 |

FIG. 11

| SOFTWARE CODE | SERIAL NUMBER | USER REGISTRATION NUMBER | REGISTRATION DATE | USING STATUS | REQUESTED INFORMATION TYPE |
|---|---|---|---|---|---|
| V0002121 | 256-7652429 | XXXXXXXXXX | 1996.12.10 | 35 | A |
| M0123221 | H2B423345 | XXXXXXXXXX | 1996.12.10 | 21 | |
| ZZ014144 | RT-5422 | XXXXXXXXXX | 1996.12.30 | 5 | A, B, C |

F I G. 1 2

| SOFTWARE CODE | USER REGISTRATION NUMBER | OBTAINED ON | INFORMATION | INFORMATION TYPE |
|---|---|---|---|---|
| V0002121 | XXXXXXXXXX | 1997.01.31 | INFORMATION ABOUT VERSION-UP OF ○○ | A |
| M0123221 | XXXXXXXXXX | 1996.12.10 | INFORMATION ABOUT NEW PRODUCT OF XX COMPANY | A |
| ZZ014144 | XXXXXXXXXX | 1997.01.31 | INFORMATION ABOUT SEMINAR OF ZZ LINKAGE WITH VV | C |

FIG. 13

| PERSONAL AUTHENTI- CATION ID | PASSWORD | NAME | READING | POST CODE | ADDRESS | TELEPHONE NUMBER | E-MAIL | CORPORATION/ PERSON | GENDER | BIRTHDAY | USER REGIS- TRATION NUMBER |
|---|---|---|---|---|---|---|---|---|---|---|---|
| HHHXXX001 | ****** | HANAKO EBISU | HANAKO EBISU | 150 | SHIBUYA, TOKYO... | 03- | | PERSON | F | 1965.02.04 | XXXXXXXXX |

F I G. 1 4

| SOFTWARE CODE | PERSONAL AUTHEN-TICATION ID | USER REGIS-TRATION NUMBER | SERIAL NUMBER | REGISTRATION DATE | USING STATUS | REQUESTED IN-FORMATION TYPE | NUMBER OF TIMES OF OBTAINING INFORMATION |
|---|---|---|---|---|---|---|---|
| V0002121 | HHHXXX001 | XXXXXXXXXXX | 256-7652429 | 19961204 | 35 | A | 5 |
| H0051011 | KKKXXX002 | XXXX1XXXXX1 | MM670-FG7J2 | 19961204 | 1 | | 0 |
| 0PQ11111 | PPPXXX004 | XXX11XXXXX2 | 382637409 | 19961204 | 10 | A, B, C | 1 |

F I G. 1 5

| SOFTWARE CODE | REGISTRATION DATE | START OF DISPLAY | END OF DISPLAY | SERIAL NUMBER | USING STATUS | INFORMATION TYPE | RELATED SOFTWARE CODE | INFORMATION |
|---|---|---|---|---|---|---|---|---|
| V0002121 | 19970204 | 19970205 | 19970531 | | | A | | INFORMATION ABOUT VERSION-UP OF ○○○ |
| M0123221 | 19970204 | 19970204 | 19971204 | | | A | | INFORMATION ABOUT NEW PRODUCT OF XX COMPANY |
| ZZ014144 | 19961230 | 19961230 | 19961230 | | <10 | C | VV735624 | INFORMATION ABOUT SEMINAR OF ZZ LINKAGE WITH VV |
| SDF39211 | 19961230 | 19961230 | 19961230 | 451201<,<451300 | | A | | URGENT INFORMATION ABOUT DELIVERED PRODUCTS INFECTED WITH VIRUS! |

INFORMATION EXTRACTION CONDITIONS

| No. | SCREEN IMAGE | CONTENTS OF SCREEN PROCESSES | |
|---|---|---|---|
| | | NAME OF FORM | |
| 1 | SOFTWARE REGISTRATION/REFERENCE TOOL  □ X<br>"OOO" USER REGISTRATION SCREEN    ICON<br>IMAGE GRAPHICS (PRES LOGO)<br>DESCRIPTION<br>DESCRIPTION OF MOUSE POINT    TO NEXT STEP | TITLE OF SCREEN | "OOO" USER REGISTRATION SCREEN (OOO IS SOFTWARE NAME |
| | | DESCRIPTION OF PROCESS CONTENTS | PROCESS PERFORMED BY TOOL IS INDICATED ON SCREEN DISPLAYING START UP OF REGISTRATION/REFERENCE TOOL |
| | | DESCRIPTION OF WINDOW | "OOO" IS NEWLY REGISTERED/REGISTRATION-CHANGED/OBTAINING LATEST INFORMATION. THIS PROCESS IS PERFORMED USING COMPANY OR DOMESTIC TELEPHONE LINE. WHEN PROCESS IS PERFORMED, VARIOUS SUPPORTS CAN BE PROVIDED FROM VENDOR. |
| | | FUNCTIONS OF BUTTONS | TO NEXT STEP |
| | | REMARKS | · IMAGE GRAPHICS<br>· SCREEN SIZE 320*240 dot(4800TWIP*3600twip) |

| NAME OF FORM | |
|---|---|
| TITLE OF SCREEN | INPUT OF REGISTRATION INFORMATION OF "○○○" |
| DESCRIPTION OF PROCESS CONTENTS | INFORMATION RECEIVED FROM SOFTWARE IS DISPLAYED AND OTHER INFORMATION IS PROMPTED |
| DESCRIPTION OF WINDOW | SOFTWARE REGISTRATION INFORMATION TO BE USED IS DESCRIBED AS FOLLOWS. INPUT SERIAL NUMBER BY REFERRING TO MANUALS, ETC. |
| FUNCTIONS OF BUTTONS | TO NEXT STEP |
| REMARKS | • INFORMATION NOT PROVIDED BY SOFTWARE IS INPUT HERE<br>• IMAGE GRAPHICS (IMAGE OF SOFTWARE) |

| NAME OF FORM | SOFTWARE REGISTRATION/REFERENCE TOOL |
|---|---|
| TITLE OF SCREEN | CHECKING REGISTRATION INFORMATION OF "○○○" |
| DESCRIPTION OF PROCESS CONTENTS | NOTIFICATION FROM SOFTWARE AND INFORMATION INPUT BY USER ARE CHECKED. |
| DESCRIPTION OF WINDOW | CHECK INFORMATION JUST INPUT. IF CORRECT, GO TO NEXT STEP. |
| FUNCTIONS OF BUTTONS | AMENDMENT/TO NEXT STEP |
| REMARKS | |

| | NAME OF FORM | INPUT 1 OF USER INFORMATION |
|---|---|---|
| | TITLE OF SCREEN | INPUT 1 OF USER INFORMATION |
| | DESCRIPTION OF PROCESS CONTENTS | SCREEN ON WHICH PERSONAL INFORMATION IS INPUT WHEN THIS TOOL IS FIRST USED (REGISTRATION TYPE/NAME, ETC.) |
| 1 | DESCRIPTION OF WINDOW | USER PERSONAL INFORMATION INPUT HERE (TELEPHONE NUMBER, ETC.) IS VERY INPORTANT FOR SUPPORT HEREAFTER. PLEASE INPUT NECESSARY ITEMS. |
| | FUNCTIONS OF BUTTONS | TO NEXT STEP |
| | REMARKS | . . |

FIG. 20

| NAME OF FORM | INPUT 2 OF USER INFORMATION |
|---|---|
| TITLE OF SCREEN | INPUT 2 OF USER INFORMATION |
| DESCRIPTION OF PROCESS CONTENTS | SCREEN ON WHICH USER INFORMATION (ADDRESS, ETC.) IS INPUT. (CONTINUED FROM SCREEN ABOVE) |
| DESCRIPTION OF WINDOW | USER PERSONAL INFORMATION INPUT HERE (TELEPHONE NUMBER, ETC.) IS VERY IMPORTANT FOR SUPPORT HEREAFTER. PLEASE INPUT NECESSARY ITEMS. |
| FUNCTIONS OF BUTTONS | RETURN/TO NEXT STEP |
| REMARKS | |

| NAME OF FORM | SOFTWARE REGISTRATION/REFERENCE TOOL |
|---|---|
| TITLE OF SCREEN | CHECKING USER INFORMATION |
| DESCRIPTION OF PROCESS CONTENTS | CHECKING INPUT/PERSONAL INFORMATION |
| DESCRIPTION OF WINDOW | PLEASE CHECK INFORMATION JUST INPUT. PLEASE NOTE THAT ADDRESS, ETC. CAN BE AMENDED HEREAFTER, BUT NAME CANNOT BE AMENDED (EXCLUDING CORPORATION REGISTRATION INFORMATION). IF CORRECT, GO TO NEXT STEP. |
| FUNCTIONS OF BUTTONS | AMENDMENT/TO NEXT STEP |
| REMARKS | |

FIG. 23

| NAME OF FORM | |
|---|---|
| TITLE OF SCREEN | LET'S START REGISTRATION |
| DESCRIPTION OF PROCESS CONTENTS | EXPLANATORY SCREEN ON WHICH ONLINE REGISTRATION IS MADE USING TELEPHONE LINE |
| DESCRIPTION OF WINDOW | ALL INFORMATION HAS BEEN INPUT. MAKE USER REGISTRATION. WHEN USER REGISTRATION IS COMPLETED, LATEST INFORMATION SUCH AS INFORMATION ABOUT SOFTWARE VERSION-UP, AND VARIOUS SUPPORT INFORMATION IS AVAILABLE. |
| FUNCTIONS OF BUTTONS | CANCEL/SET COMMUNICATIONS ENVIRONMENT/DIAL ILLUSTRATED BUTTON |
| REMARKS | • FOR CANCEL, SUBSEQUENT PROCESSES ARE PERFORMED. |

| NAME OF FORM | SOFTWARE REGISTRATION/REFERENCE TOOL | |
|---|---|---|
| TITLE OF SCREEN | COMMUNICATING | |
| DESCRIPTION OF PROCESS CONTENTS | SCREEN ON WHICH ONLINE REGISTRATION IS MADE | |
| DESCRIPTION OF WINDOW | YOUR INFORMATION (SOFTWARE INFORMATION/PERSONAL INFORMATION) IS BEING REGISTERED. WAIT A MOMENT. | |
| FUNCTIONS OF BUTTONS | SUSPEND | |
| REMARKS | • PROCESS METER (INITIALIZING PORT/INITIALIZING MODEM/DIAL/COMMUNICATIONS/DISCONNECTION OF LINE) | |

| NAME OF FORM | |
|---|---|
| TITLE OF SCREEN | INFORMATION ABOUT COMPLETION OF SOFTWARE USER REGISTRATION |
| DESCRIPTION OF PROCESS CONTENTS | NOTIFICATION ABOUT COMPLETION OF SOFTWARE USER REGISTRATION, AND DISPLAY OF INFORMATION FROM VENDOR. |
| DESCRIPTION OF WINDOW | SOFTWARE USER REGISTRATION IS COMPLETED WITH RECEPTION NUMBER ◯◯◯. YOUR USER REGISTRATION NUMBER IS ◯◯◯. IT IS REQUIRED AT INQUIRY, ETC. PLEASE MEMORIZE IT. ALSO REFER TO DISPLAY OF REGISTRATION INFORMATION OF HELP MENU. |
| FUNCTIONS OF BUTTONS | TERMINATION |
| REMARKS | 40 DIGITS * 60 ROWS |

| | NAME OF FORM | |
|---|---|---|
| 1 | TITLE OF SCREEN | LET'S OBTAIN LATEST SOFTWARE INFORMATION |
| | DESCRIPTION OF PROCESS CONTENTS | SCREEN ON WHICH LATEST SOFTWARE INFORMATION OBTAINING PROCESS IS CHECKED |
| | DESCRIPTION OF WINDOW | PROCESS OF OBTAINING SOFTWARE LATEST INFORMATION IS STARTED. |
| | FUNCTIONS OF BUTTONS | CANCEL/SET COMMUNICATIONS ENVIRONMENT/DIAL ILLUSTRATED BUTTON |
| | REMARKS | • FOR CANCEL, SUBSEQUENT PROCESSES ARE PERFORMED. |

FIG. 26

| NAME OF FORM | |
|---|---|
| TITLE OF SCREEN | COMMUNICATING |
| DESCRIPTION OF PROCESS CONTENTS | SCREEN ON WHICH COMMUNICATIONS PROCESS IS PERFORMED |
| DESCRIPTION OF WINDOW | LATEST SOFTWARE INFORMAITON IS BEING OBTAINED. WAIT A MOMENT. |
| FUNCTIONS OF BUTTONS | SUSPEND |
| REMARKS | • PROCESS METER (INITIALIZING PORT/INITIALIZING MODEM/DIAL /COMMUNICATIONS/DISCONNECTION OF LINE) |

| NAME OF FORM | SOFTWARE REGISTRATION/REFERENCE TOOL |
|---|---|
| TITLE OF SCREEN | INFORMATION ABOUT LATEST SOFTWARE INFORMATION |
| DESCRIPTION OF PROCESS CONTENTS | INFORMATION THAT LATEST SOFTWARE INFORMATION HAS BEEN OBTAINED. |
| DESCRIPTION OF WINDOW | LATEST SOFTWARE INFORMATION HAS BEEN OBTAINED WITH RECEPTION NUMBER ○○○ IT IS REQUIRED AT INQUIRY, ETC. PLEASE MEMORIZE IT. |
| FUNCTIONS OF BUTTONS | TERMINATION |
| REMARKS | 40 DIGITS * 60 ROWS |

COMPUTER-RELATED PRODUCT USER MANAGEMENT AND SERVICE SYSTEM

BACKGROUND OF THE INVENTION

1. Field of the Invention

The present invention relates to the management of users of software of computers, especially personal computers, and hardware including peripherals, along with providing services to users.

Computers, especially personal computers, have become very popular in various fields, and have been accompanied by an increasing demand for applicable software and peripherals. In the case of software it is required to provide support to users who have already purchased software for Example, by performing a debugging process, removing a failure, updating the version of the purchased software, etc. Thus, to recognize users who have already purchased specific computer-related products, user entries should be prepared and the demand of users for the services should be appropriately checked so that optimal services can be provided for the users and the vendors can acquire new business chances through such services.

2. Description of the Related Art

Conventionally, user registration for software and hardware can be made by each user returning by, mail, to a vendor a registration form attached to each product. The postage may have to be paid by users.

Online registration systems exist in which it is necessary to input, to the user's computer required information in a format specified by each vendor.

Furthermore, to check the using status of software, such as the number of times the software has been started up, the conventional method is to send users individual inquiries, thereby requiring a high cost and a long time to check.

Thus, to complete conventional user registrations, a user has to input similar information each time he or she purchases a product. Therefore, the user is required to perform a difficult and/or tedious operation and pay postage to send a registration form, etc. whereas the merits and necessity of the individual information seem to be insignificant to the user. On the other hand, the vendor has to pay costs required to, for example, input hand-written information by the user on the registration form. This process also takes a long time in processing user registration information into practically effective user registration information. There also has been an increasing cost with an increasing number of users.

Furthermore, the conventional method of checking the using status has the problem that it is costly and takes a long time, and is hard to appropriately use the check results for services. From the users' view points, the merits and necessity of their cooperation in answering inquiries are not clear to them.

SUMMARY OF THE INVENTION

The present invention aims at user an easier operation for user registration for a computer-related product, realizing a real time registration, providing a vendor the user registration information along with using status information, reducing the cost and time required to check the using status of the product by a user, and appropriately providing service to a user.

The computer-related product user management and service system includes a user information general management unit as the most important component, and, as necessary, a user registration/reference unit and a vendor registration/reference unit.

The user information general management unit is provided in, for example, a user registration centre for generally managing users of computer-related products, and generally manages the user registration information and the using status information transmitted from users. The user information general management unit manages the users of software and hardware which are computer-related products, and performs important functions in a system for providing the users with useful services.

The user registration/reference unit is, for example, a user registration/reference tool commonly used for software products, and is installed as part of a software product in a user computer as being separated from the body of the software product when the software product is installed. It notifies, for example, a user registration centre of the user registration information and using status information corresponding to a plurality of software products including the above described software product, and asks the user registration centre for new information relating to software products.

Furthermore, the vendor registration/reference unit is provided on a software or hardware vendor (manufacturer) side, obtains from the user information general management unit the user registration information and the using status information transmitted from the users to the user registration centre, and notifies the user registration centre of new information about the computer-related products, thereby allowing the users to utilize the new information.

According to the present invention, when a user starts up a software product immediately after purchasing a computer, a using status monitor module determines that it is the first start up, and the user registration/reference unit transmits the user registration information to the user information general management unit for a new registration. Then a user registration is made. The contents of the user registration information can be referred to by the vendor registration/reference unit on the vendor side.

If the using status monitor determines that the number of times that the software product has been started up since the new registration has reached a given value predetermined by the vendor of the software product, then the number of the start up is transmitted as using status information from the user registration/reference unit to the user information general management unit, and the user information general management unit transmits the latest information about the software product to the user registration/reference unit. As a result, the user can obtain the latest information about the software product without any special process.

As described above, according to the present invention, the user can make a user registration in real time in a simple operation whereas the vendor can appropriately provide the user with the latest information about the computer-related product depending on the using status on the user side.

BRIEF DESCRIPTION OF THE DRAWINGS

Reference will now be made in detail to the present preferred embodiment of the present invention, examples of which are illustrated in the accompanying drawings, wherein like reference numerals refer to like elements throughout

FIG. 11 shows the contents of the file storing personal information about users;

FIG. 12 shows the contents of the file storing software registration information;

FIG. 13 shows the contents of the file storing the information from a software vendor;

FIG. 14 shows the contents of the master database storing personal information about users;

FIG. 15 shows the contents of the master database storing software registration information;

FIG. 16 shows the contents of the master database storing the information from a software vendor;

FIG. 17 shows a start up screen of a software registration/reference tool;

FIG. 18 shows an input screen for software registration information;

FIG. 19 shows a check screen for software registration information;

FIG. 20 shows an input screen (1) for personal information about users;

FIG. 21 shows an input screen (2) for personal information about users;

FIG. 22 shows a check screen for personal information about users;

FIG. 23 shows a software registration starting screen;

FIG. 24 shows a screen for performing a process of software registration;

FIG. 25 shows a software registration completion screen;

FIG. 26 shows a latest software information acquisition starting screen;

FIG. 27 shows a screen in the process of acquiring the latest software information; and FIG. 28 shows a latest software information acquisition completion screen.

DESCRIPTION OF THE PREFERRED EMBODIMENTS

Figure 1:
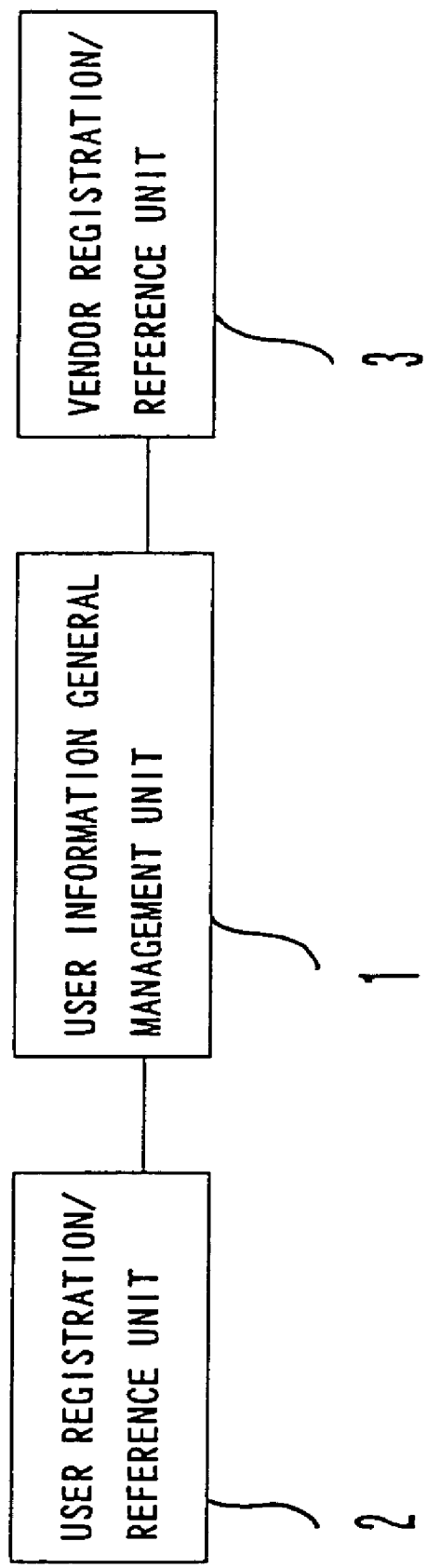
FIG. 1 is a block diagram showing the principle of the present invention.

FIG. 1 is a block diagram showing the principle of the present invention. In detail, FIG. 1 is a block diagram showing the principle of a computer-related product user management and service system, enabling an easy user registration of computer-related products and an easy check of the using status, and providing a service according to user registration information and using status information.

In FIG. 1, a user information general management unit 1 is provided in, for example, a user registration centre for generally managing users of computer-related products, and generally manages the user registration information and using status information transmitted from users. The user information general management unit 1 manages the users of software and hardware which are computer-related products, and performs important functions in a system for providing the users with useful services.

A user registration/reference unit 2 is, for example, commonly used for software products, and is installed as part of a software product in a user computer, separated from the body of the software product when the software product is installed. It provides the user registration information and using status information corresponding to a plurality of software products including the above described software product, and requests new information relating to software products to the user registration centre.

Furthermore, a vendor registration/reference unit 3 is provided on a software or hardware vendor (manufacturer) side, obtains the user registration information and the using status information, transmitted from the user to the user information general management unit 1, and notifies the user information general management unit 1 of new information about the computer-related products.

Figure 2:
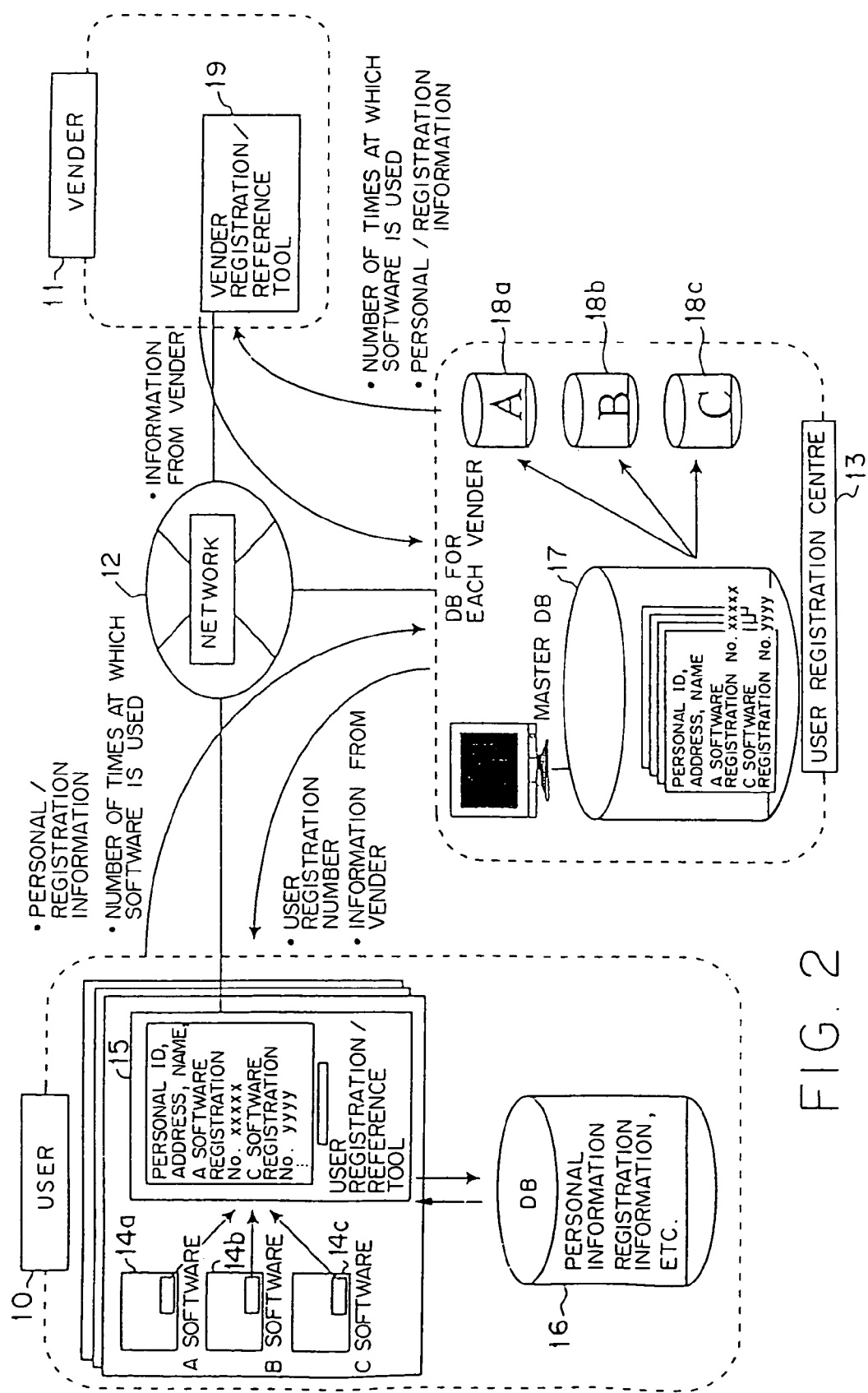
FIG. 2 is a block diagram showing the configuration of the software user registration system.

FIG. 2 is a block diagram showing the configuration of the software user registration system as an embodiment of the computer-related product user management and service system. The present invention is applicable not only to software but also to all computer-related product user management and service systems including hardware. Described below are embodiments of a user management and service system for handling software products which require user entries much more than other computer-related products and require support services from vendors.

In the system shown in FIG. 2, a user 10 and a vendor 11 are connected to a user registration centre 13 through a network 12, for example, an Internet and personal computer communications.

A user registration/reference tool 15 commonly used in registering plural sets of software 14*a* through 14*c* and a database 16 for storing personal information about each user and registration information about software, etc. are provided on the user 10 side.

When the user 10 tries to install software A 14*a* first, the user registration/reference tool 15 incorporated into the software is installed separately from the body of the software product, and is used for a registration for use of the software 14*a*. Using the user registration/reference tool 15, personal information about an individual user such as the name and the address of the user, etc. and software registration information such as the serial number of the software, etc. are stored in a master database 17 in the user registration centre 13 through the network 12. The stored data is further stored in any of databases 18*a* through 18*c* for respective software vendors.

From the user registration centre 13, for example, a user registration number uniquely assigned to each software code is provided for the user registration/reference tool 15 through the network 12, and the registration information about the software containing the provided contents and personal information about individual users are stored in the database 16 on the user side. The registration information containing a user registration number is stored in the database 16 without starting another specific communications software, and the user can be informed of the stored data on, for example, the help screen.

A vendor registration/reference tool 19 is provided on the vendor 11 side, and the vendor 11 refers to user personal/registration information stored in any of the databases 18*a* through 18c for each vendor using the vendor registration/reference tool 19, and notifies the user registration centre 13 of the latest information about software as information from the vendor so that the contents of the information can be stored in any of the databases 18a through 18c for each vendor.

When the frequency of use of specific software, for example, the number of times of starting up, reaches a predetermined value, the user registration/reference tool 15 notifies the user registration centre 13 of the value through the automatically connected network 12. The frequency of use is referred to by the vendor registration/reference tool 19. According to the notified frequency of use, the information from the vendor is transmitted as the latest information about the software from the user registration centre 13 to the user registration/reference tool 15 through the network 12. Thus, the user 10 can obtain the latest information about the software. When the frequency reaches a predetermined value, a message from the vendor is displayed to the user, and the user determines whether or not the using status data should be provided to the user registration centre. At a request from the user, the network is automatically connected and the using status data is transmitted.

Figure 3:
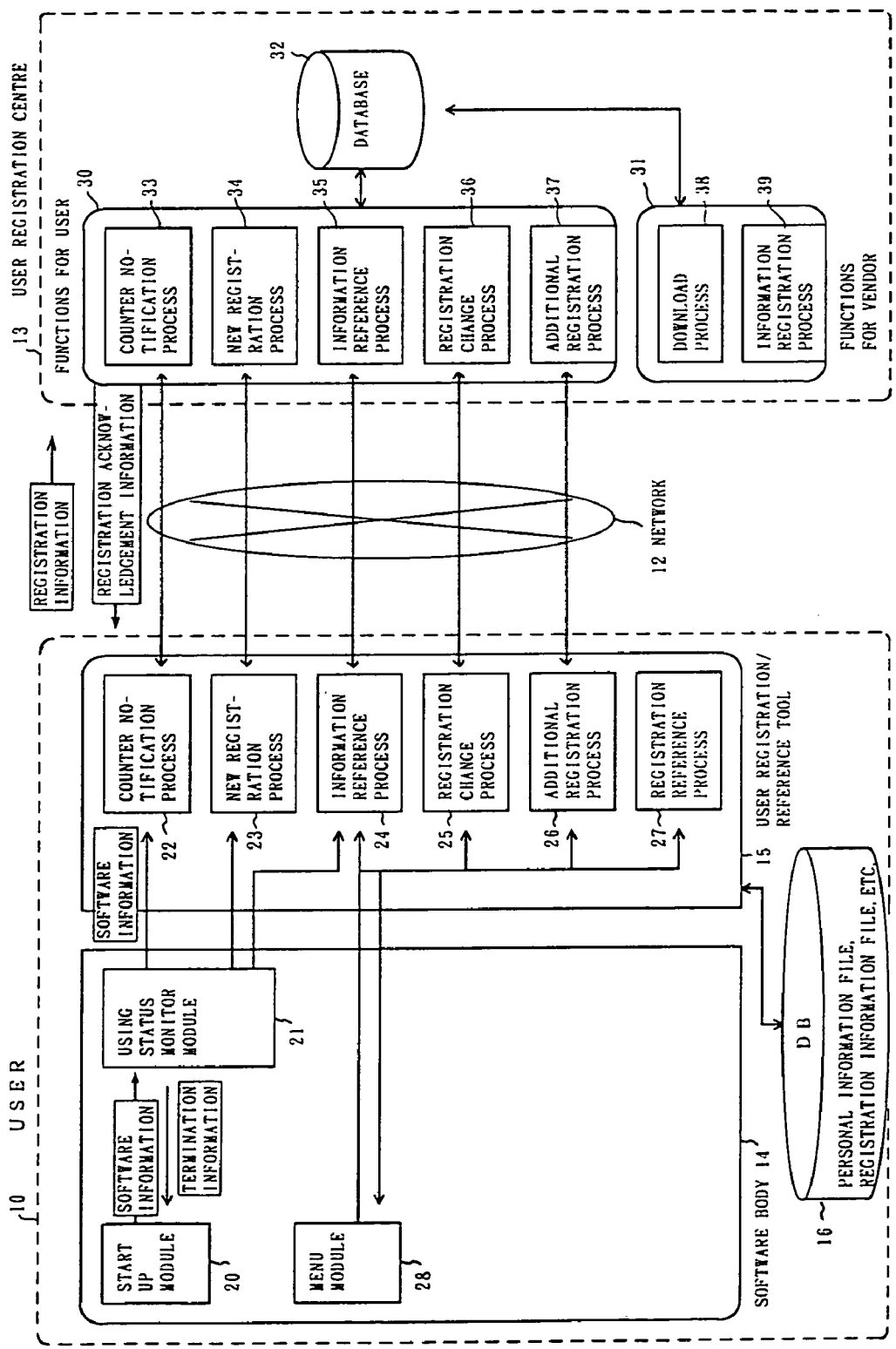
FIG. 3 shows the process performed by the software user registration system shown in FIG. 2.

FIG. 3 shows various processes performed between, for example, a personal computer (PC) on the user 10 side and, for example, a server on the user registration centre 13 side relating to the system shown in FIG. 2. In FIG. 3, there are the body of the software 14, the user registration/reference tool 15, and the database 16 on the user 10 side. The user registration/reference tool 15 is fundamentally common among a plurality of normal software products. For example, when a software product (SP1) is installed in a personal computer, the user registration/reference tool 15 is installed as separated from the body of the software product so that it can be used in a user registration process for the software product SP1.

When a user registration is made for a different software product (SP2), the user registration/reference tool 15 incorporated into the already installed software product (SP1) is invoked to be used in the user registration. However, the user registration/reference tool 15 is updated for a new version corresponding to the changes in the representation for the operating system. If the user registration/reference tool 15 incorporated into the software product to be used in the user registration is a newer than the already installed version, then the user registration/reference tool 15 is updated and a new tool is used.

The processes performed on the user 10 side are: a counter notification process 22 for notifying the user registration centre 13 of the number of times of starting up as using status data according to the monitor result of a using status monitor module 21 for monitoring the number of times of starting up of software; a new registration process 23 for making a registration for use of new software; an information reference process 24 for referring to the latest information provided from the vendor of the software product, about the software product which has already been registered for use, and is actually being used, that is, the information from the vendor in FIG. 2; a registration change process 25 for changing the already registered contents; an additional registration process 26 for adding a new registration to new software; and a registration reference process 27 for referring to the already registered contents.

In these processes, the counter notification process 22, the new registration process 23, and the information reference process 24 are invoked by a start up module 20 inside the body of the software 14, receive software information such as the name of the vendor of the software the name of the software, the version number, etc. through the using status monitor module 21 from the start up module 20, and performs the processes according to the software information, etc. When the process terminates, termination information is returned to the start up module 20, and then the process of the body of the software is performed. The using status monitor module 21 makes the new registration process 23 perform when the number of times of starting up is 0, makes the counter notification process 22 perform when the number of times of starting up has reached the number of times a notification should be transmitted to the user registration centre 13, and makes the information reference process 24 perform when a number of times, predetermined by the vendor of a software product, at which new information should be referred to, is reached.

The information reference process 24 can also be started by a call from a menu module 28. When the user wants to receive the latest information about a software product, for example, the process starts with the user's click of the 'latest information' button on the menu. On the other hand, the registration change process 25, the additional registration process 26, and the registration reference process 27 are started only by the call from the menu module 28.

The processes of the functions for user 30 on the user registration centre 13 side are a counter notification process 33; a new registration process 34; an information reference process 35; a registration change process 36; and an additional registration process 37. The processes of the functions for vendor 31 on the user registration centre 13 side are a download process 38 and an information registration process 39. Various databases 32 in the user registration centre 13 correspond to the master database 17 shown in FIG. 2 and the databases 18a through 18c for each vendor.

Various processes of the functions for user 30 correspond to the identically named processes performed by the user registration/reference tool 15, and are performed corresponding to the process performed on the user registration/reference tool 15 side, and the process results are returned to the user 10 side as necessary. For example, the new registration process 34 is performed according to the registration information transmitted as a result of the new registration process 23 on the user 10 side. The registration acknowledgement information indicating the process result is returned to the user 10 side.

The download process 38 of the functions for vendor 31 classifies the user personal information and the software registration information transmitted from the user 10 side for each vendor, and transmits the information to the vendor. The information registration process 39 stores the information from the vendor shown in FIG. 2, that is, the latest information about the software product in the database 32. The registration reference process 27 on the user 10 side has no corresponding process on the user registration centre 13 side, but refers to the registered data about a software product, that is, the personal information, and the registration information about the software, etc. stored in the database 16, on the user side.

Figure 4:
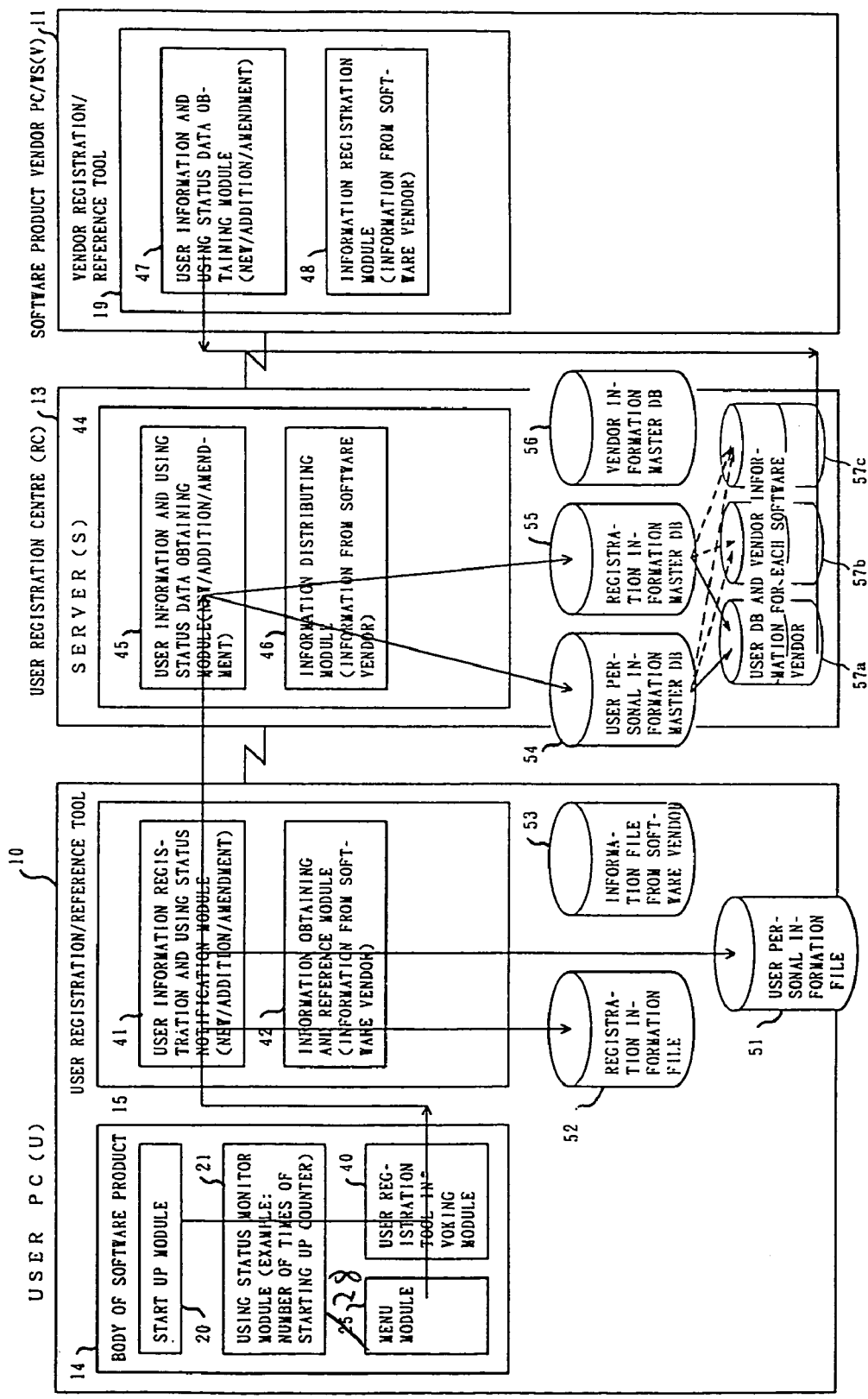
FIG. 4 shows the user registration process system associated with a system configuration.
Figure 5:
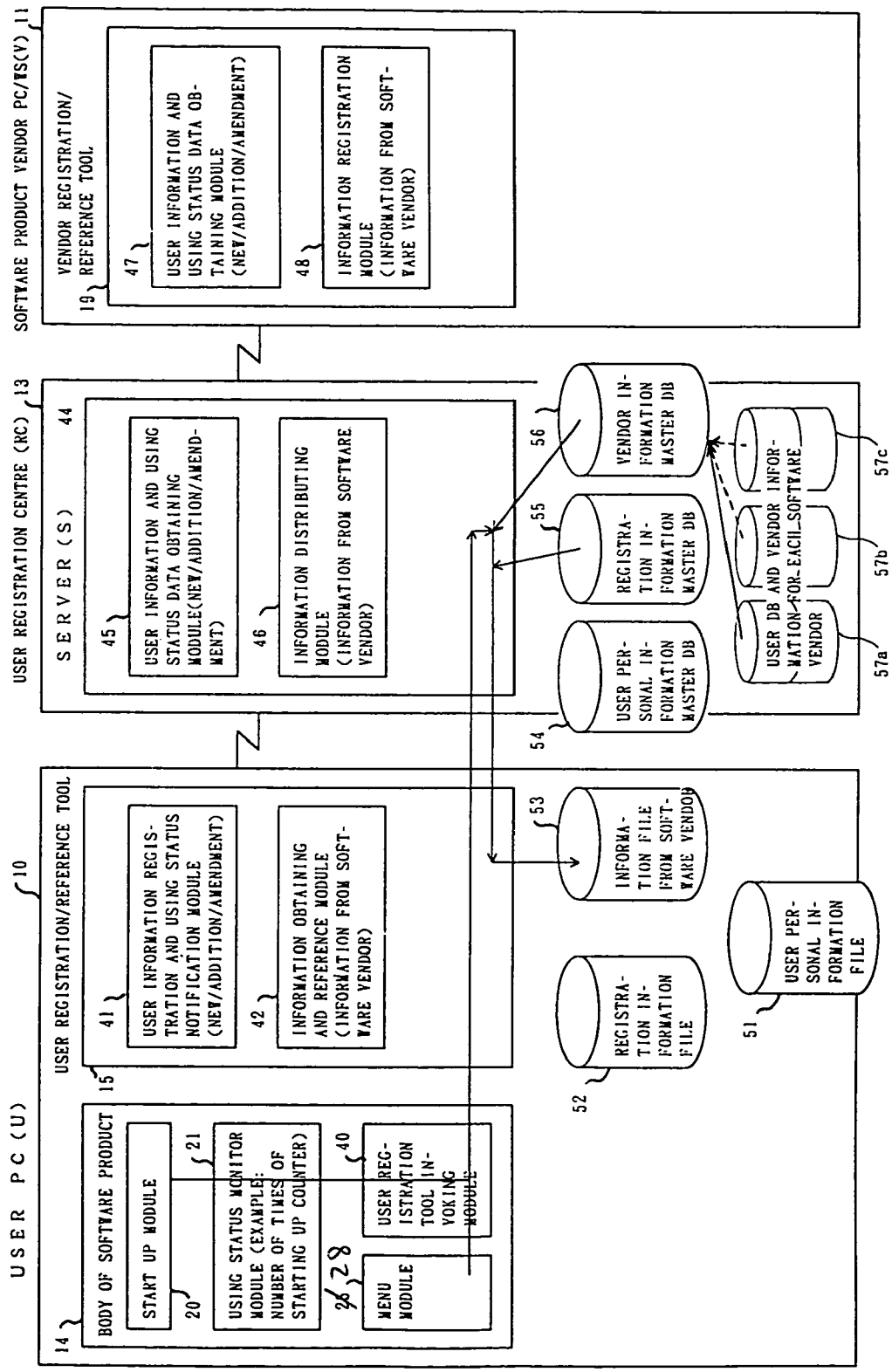
FIG. 5 shows the latest information reference system associated with the system configuration.

FIGS. 4 and 5 show the software user registration system and the latest information reference system related to the system configuration. FIG. 4 shows the new user registration system for a software product. In FIG. 4, as in FIG. 3, a personal computer PC (U) on the user side includes the software body 14, the user registration/reference tool 15, a user personal information file 51, a registration information file 52 about software, and a file 53 for storing the latest information from the software vendor.

The user registration centre (RC) 13 includes a user information and using status data obtaining module 45 and an information distribution module 46 as an internal configuration element; a master database 54 for storing user personal information; a master database 55 for storing software registration information; a master database 56 for storing the latest information about the software from the vendor; and databases 57a through 57c for each vendor.

On the other hand, for example, a personal computer PC or a workstation WS (V) on the software product vendor 11 side includes the vendor registration/reference tool 19 containing a user information and using status data obtaining module 47 and an information registration module 48 as a component.

The procedure of the new registration process for the software product 14 is described by referring to FIG. 4. When the software product 14 is started by the start up module 20, it is determined by the using status monitor module 21, for example, a number of times of starting up counter that the software product 14 is started for the first time. Then, a user registration tool invoking module 40 invokes the user registration/reference tool 15.

A user information registration and using status notification module 41 in the tool transmits personal information about a user and software registration information to the user information and using status data obtaining module 45 forming part of the server 44 in the user registration centre 13. The user personal information is stored in the master database 54, and the registration information about the software is stored in the master database 55. The personal information about the user and the registration information about the software are distributed to a database corresponding to the registered software vendor in the master databases 54 and 55 among the databases 57a through 57c for each software vendor.

When the information registration is completed, the server 44 notifies the user registration/reference tool 15 of the termination result of the process. The termination result contains a user registration number for each software code as a part of the registration information about the software. The user registration number is uniquely assigned by the user registration centre 13 in such a format that a software vendor can be identified. On the user 10 side, the personal information about a user used in the user registration is stored in the file 51, and the software registration information containing the user registration number is stored in the file 52.

The user information and using status data obtaining module 47 in the vendor registration/reference tool 19 on the software product vendor 11 side obtains personal information about a user and software registration information stored in the databases 57a through 57c for each vendor. The information registration module 48 transmits, as necessary, the latest information about a registered software product, that is, the information from the software vendor to the user registration centre 13, and the vendor information is stored in the master database 56, and stored in any of the databases 57a through 57c for each software vendor.

In FIG. 4, the user registration/reference tool 15 is invoked from the user registration tool invoking module 40 through the call from the menu module 28 inside the body of the software product 14 on the user 10 side, and the user registration process is performed when the registration change process 25 or the additional registration process 26 described by referring to FIG. 3 is performed. The registration process in this case is performed similarly to the new registration process.

FIG. 5 shows the latest information reference system for software. In FIG. 5, when the body of a software product 14 is started by the start up module 20 in the software 14 on the user 10 side, the using status monitor module 21, for example, a number of times of starting up counter determines the number of times of starting up of the software. If it determines that the number of times, at which the latest information about the software should be referred to, preliminarily specified by the vendor, has been reached, then the user registration tool invoking module 40 invokes the user registration/reference tool 15, and an information obtaining and reference module 42 in the user registration/reference tool 15 requests the information distributing module 46 of the server 44 in the user registration centre 13 to distribute information from the software provider.

In response to the request, the information distributing module 46 extracts information from a database for each software provider, for example, database 57a through the master database 55 for storing software registration information, and the master database 56 for storing information from a vendor or provider, transmits the extraction result to the information obtaining and reference module 42 on the user 10 side. The information is displayed to the user 10, and stored in the information file 53 for storing the information from the software vendor or provider. Thus, even if the number of times of software starting up, at which the latest information should be referred to, has not reached the software vendor-specified number of times, the user, for example, can instruct the user registration tool invoking module 40 to invoke the user registration/reference tool 15 through a call from the menu module 28, thereby the process of obtaining the latest information is performed.

Figure 6:
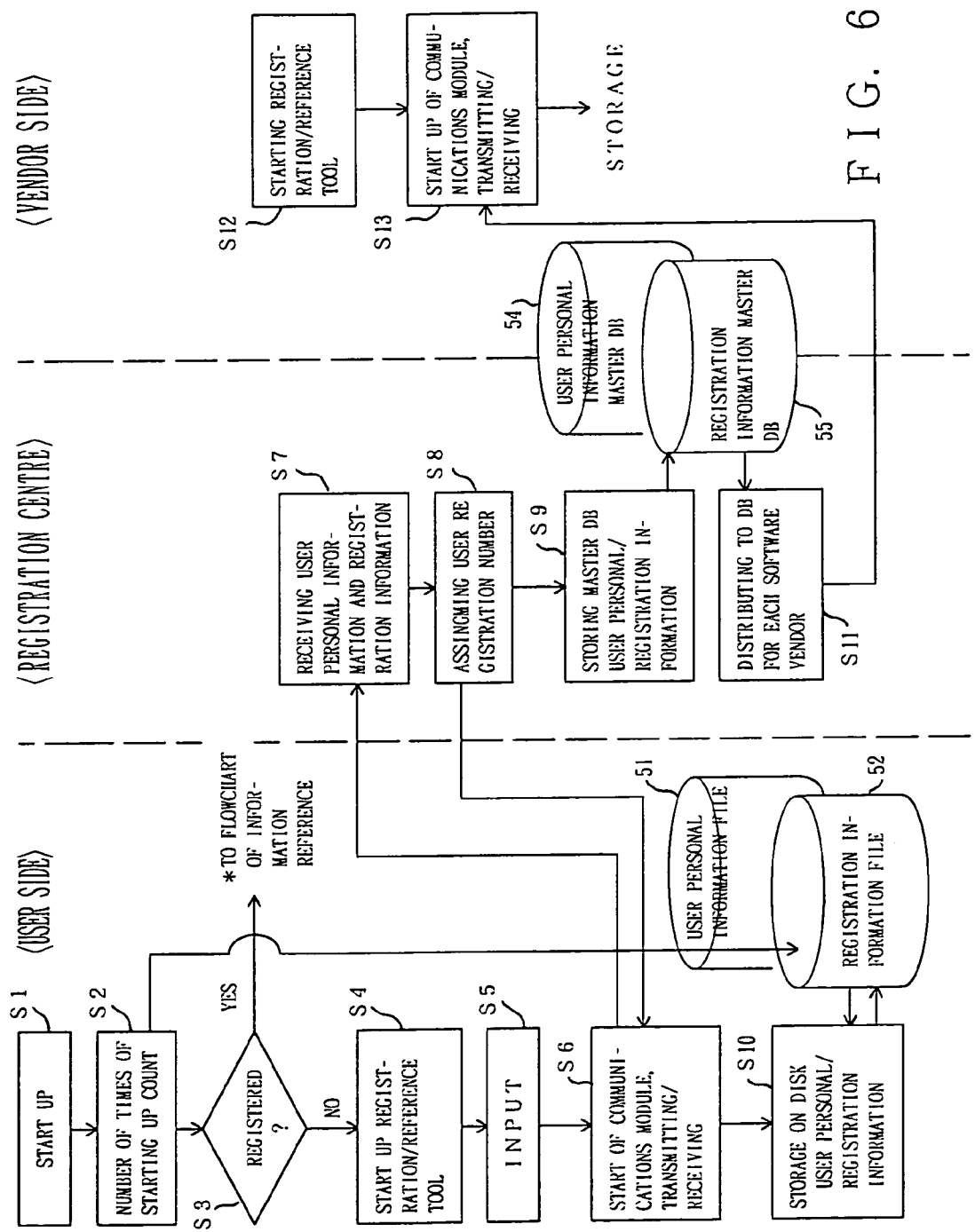
FIG. 6 is a flowchart showing the user registration process.
Figure 7:
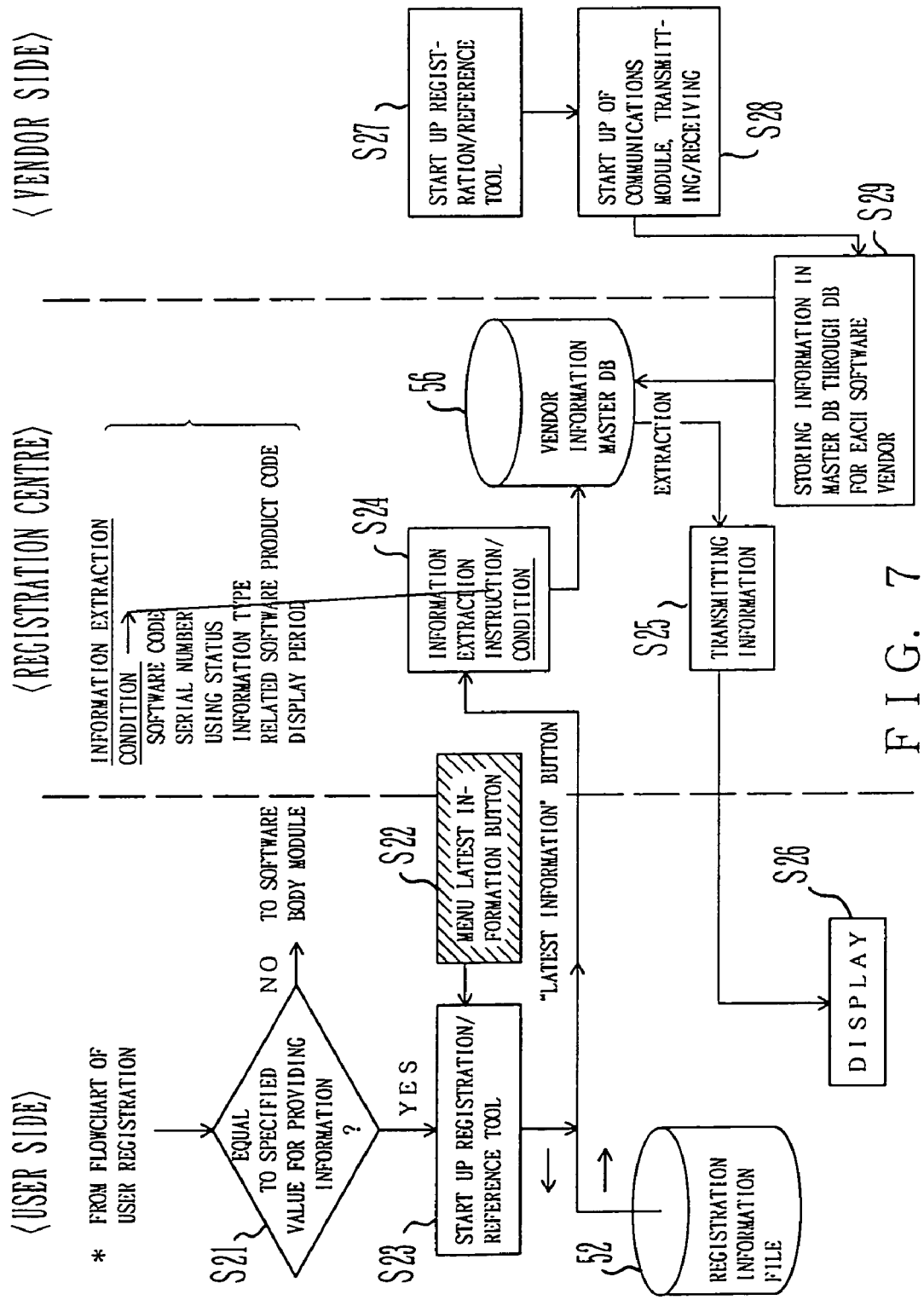
FIG. 7 is a flowchart showing the latest information reference process.

FIGS. 6 and 7 are flowcharts showing the user registration process and the latest information reference process corresponding to FIGS. 4 and 5. When the process starts in the user registration process flowchart shown in FIG. 6, the body of the software product 14 is first started in step S1. In step S2, the number of times of starting up of the software product is counted. In step S3, it is determined whether or not the software product has already been registered. If it has already been registered, control is passed to the flowchart of the latest information reference process of FIG. 7.

If the registration has not been made for the started software product, a registration/reference tool is started in step S4. In step S5, the personal information about users and the registration information for the software are input. The input of the information is described later by referring to an example of a screen.

Then, in step S6, a communications module is started, and the user personal information and the software registration information are transmitted from the user to the registration centre.

On the user registration centre side, the user personal information and the software registration information are received in step S7. In step S8, a user registration number is assigned corresponding to the software, for example, a software code. After sending the result to the user, the software registration information including the user registration number and the user personal information are respectively stored in the databases 55 and 54 in step S9.

On the user side, the user registration number is received in step S6, and the software registration information including the reception result and the user personal information are respectively stored in the files 52 and 51.

On the other hand, the vendor is informed from the registration centre that new information has been registered. In step S12, a registration/reference tool is started. In step S13, the vendor starts a communications module, and requests the registration centre to transmit newly registered information. The registration centre distributes the contents of the master database 54 for storing the user personal information and the master database 55 for storing the software registration information to the database for each vendor in step S11, and transmits the distributed results to the vendor. The vendor receives the result in step S13, and stores the contents in the memory not shown in FIG. 6.

FIG. 7 is a flowchart showing the latest information reference process performed when it is determined that the registration for the software product started in step S3 shown in FIG. 6 has already been made. Described below by referring to FIG. 5 is the case in which the user registration tool invoking module 40 is called by the using status monitor module 21, not by the menu module 25, and the user registration/reference tool is then invoked.

First in step S21, it is determined whether or not the number of times of starting up is equal to the value preliminarily specified by the software vendor as the number of times of starting up at which the latest information should be referred to. If the number of times of starting up is not equal to the specified value, then control is passed to the process of the module of the body of the software, and the latest information reference process is not performed.

If it is determined that the number of times of starting up is equal to the specified value, then the user registration/reference tool is started in step S23, and providing of the latest information is requested to the registration centre using the contents of the file 52 for storing the registration information about the software.

The registration centre transmits an information extraction instruction together with the information extraction condition to the master database 56 for storing the information from the vendor in step S24. The extracted information is transmitted to the user side in step S25, and the transmitted information is displayed in step S26. The display of the information is described later by referring to an example of a screen.

The information extraction conditions referred to in this embodiment are a software code, a serial number, using status data, that is, a number of times of starting up, information type related to, for example, user's experience in using a software product, a related software product code to be used in combination, a display period during which the latest information is displayed.

On the vendor side, the registration/reference tool is started in step S27. In step S28, the communications module is started and the latest information is transmitted to the registration centre. On the registration centre side, the information is stored in the master database 56 through the database for each software vendor and transmitted to the user corresponding to the extraction condition in step S29.

The program for realizing the process of each step in the above described flowchart is stored in the memory, not shown in FIG. 4, of the user registration centre (RC) 13, the user personal computer PC (U) 10, a personal computer or workstation PC/WS (V) 11, and is executed to perform various processes shown in FIG. 3.

Figure 8:
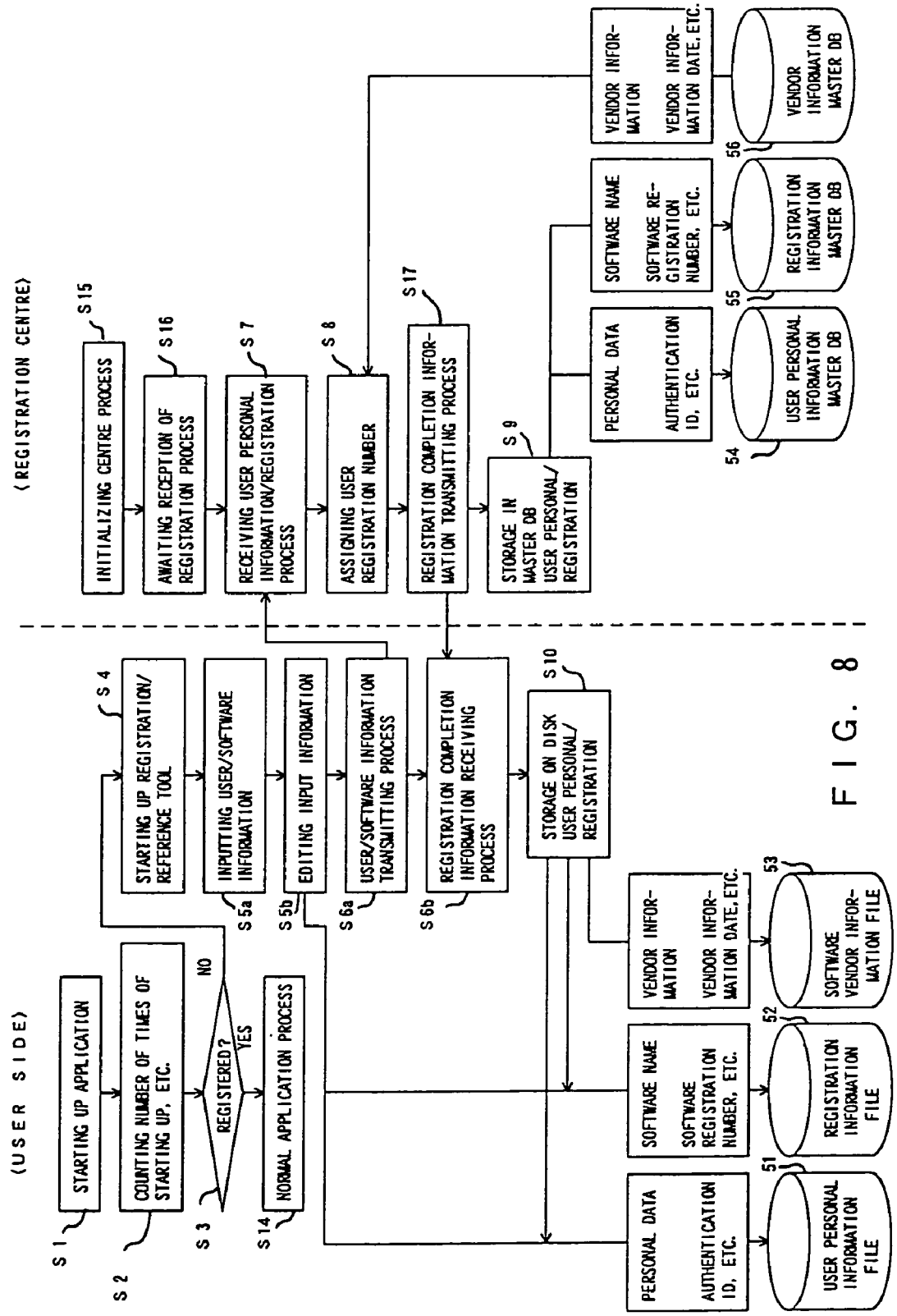
FIG. 8 is a detailed flowchart showing the user registration process.

FIG. 8 is a detailed flowchart showing the user registration process. Unlike the flowchart in FIG. 6, the information reference step is not taken, but a normal process is performed as an application in step S14 when it is determined that the software of the application started in step S3 has already been registered.

Furthermore, step S5 shown in FIG. 6 is divided into step S5a in which user personal information and software registration information are input and step S5b in which input information is edited. Of the edited input information, a personal authentication identification number is stored in the user personal information file 51, and a software name is stored in the registration information file 52.

As the first half of the communications module start up transmitting/receiving process in step S6 shown in FIG. 6, the user/software information transmitting process is performed in step S6a as shown in FIG. 8. On the registration centre side, the reception of the registration process is awaited in step S16 after initializing the centre process in step S15, and vendor information stored in the vendor information master DB 56 is assigned when a user registration number is assigned in step S8 as in step s6.

In FIG. 8, the registration completion information transmitting process is performed in step S17 after the process in step S8. After the registration completion information is transmitted to the user, data is stored in the master DB in step S9 as shown in FIG. 6. The user personal information is stored in the user personal information master DB 54, and the software registration information is stored in the registration information master DB 55.

The registration completion information transmitted from the registration centre side is received on the user side in the registration completion information receiving process in step S6a, and the contents are stored on a disk in step S10 as in FIG. 6. Files to be stored are the user personal information file 51, the registration information file 52, and the software vendor information file 53.

Figure 9:
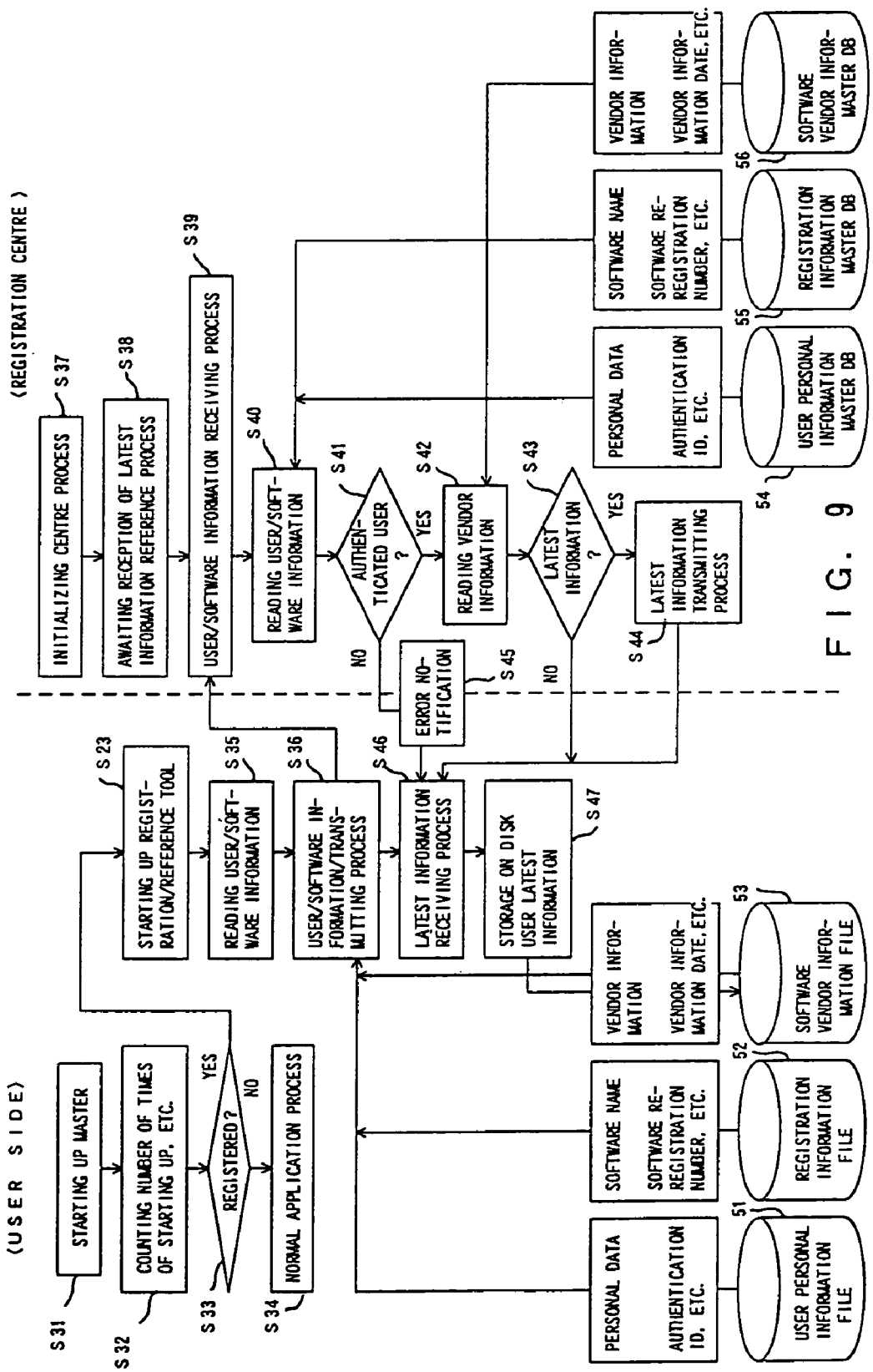
FIG. 9 is a detailed flowchart showing the latest information reference process.

FIG. 9 is a further detailed flowchart showing the latest information reference process. In FIG. 9, the process in which a registration/reference tool is invoked from the menu module 28 is described.

As shown in FIG. 8, an application is started on the user side in step S31, and the number of times of starting up is counted in step S32. Then, in step S33, it is determined whether or not a registration/reference tool has been started from the menu module in step S33. If not, a normal process is performed as an application in step S34.

If the start up is performed from a menu module, the registration/reference tool is started in step S23 as shown in FIG. 7, and the user personal information, the software registration information are read in step S35. The information is read, as necessary, from the user personal information file 51, the registration information file 52, and the software vendor information file 53. The read user personal information and software registration information are transmitted to the registration centre in the transmitting process in step S36.

On the registration centre side, the latest information reference process is awaited in step S38 after the centre process initialization in step S37. When a latest software information reference request is received in the process of receiving the user personal information from the user side and the software registration information in step S39, the user personal information and the software registration information respectively stored in user personal information master DB 54 and the registration information master DB 55 are read, and it is determined in step S41 whether or not the reference requesting user is an authenticated user of the software to be referenced. If yes, the vendor information is read from the vendor information master DB 56 in step S42, and it is determined in step S43 whether or not the information is the latest information. If yes, the latest information is transmitted to the user side in the latest information transmitting process in step S44.

If it is determined in step S41 that the reference requesting user is not an authenticated user, then an error notification is transmitted to the user side in step S45. If it is determined in step S43 that the information is not the latest information, the user is informed that no latest information exists.

The latest information, an error notification, etc. are received on the user side in the receiving process in step S46. For example, the latest information is stored in the software vendor information file 53 as necessary in step S47, thereby terminating the process.

Figure 10:
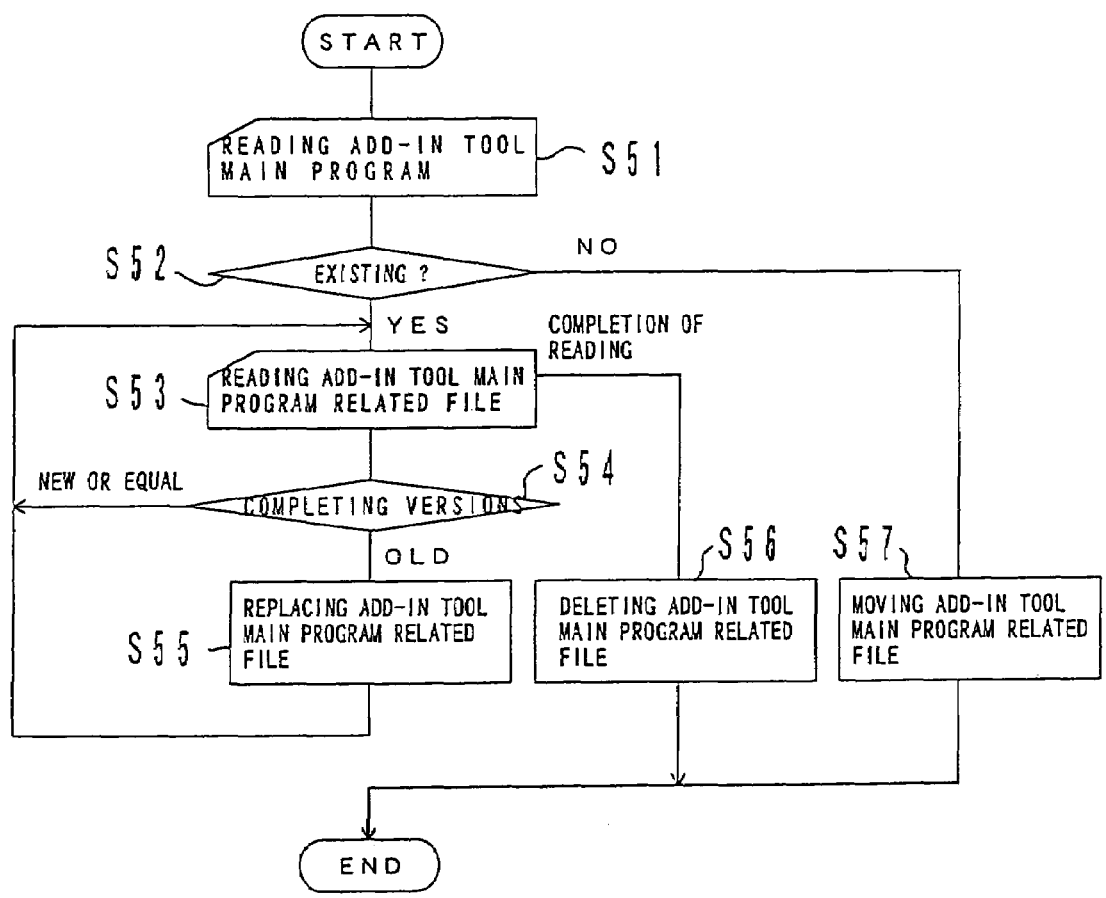
FIG. 10 is a flowchart showing the tool updating process corresponding to the update of the version of the user registration/reference tool.

FIG. 10 is a flowchart showing the tool updating process corresponding to the update of the version of the user registration/reference tool. According to the present embodiment, the user registration/reference tool mainly comprises the user information registration and using status notification module 41 and the information obtaining and reference module 42 as shown in FIG. 4. The above described modules are hereinafter referred to as add-in tool main programs. In addition to the add-in tool main program, the user registration/reference tool 15 comprises an add-in tool related file and a registration information related file. According to the present embodiment, the add-in tool related file corresponds to a network access point file.

The flowchart shown in FIG. 10 is based on, for example, marketed software, that is, an application, installed on the personal computer on the user side. In this case, the user registration/reference tool, that is, an add-in tool, is contained in the directory of an application immediately after the installation. In the personal computer on the user side, an add-in tool being operated exists in the system directory of the personal computer.

When the process starts in FIG. 10, the add-in tool main program corresponding to newly purchased software is read in step S51. In step S52, it is determined whether or not the system directory of the personal computer contains an add-in tool. If not, it indicates that the user registration/reference tool, that is, the add-in tool, is first installed in the personal computer. As a result, the add-in tool main program is moved into the directory in step S57, thereby terminating the process.

If it is determined in step S52 that an add-in tool exists in the system directory of the personal computer, then the existing add-in tool main program and a related file is read in step S53, and the versions are compared with each other in step S54. If the add-in tool existing in the system directory is older, then the add-in tool main program is replaced with the new version of the related file in step S55. If the resultant contents are new or equal, then control is passed to step S53 without performing the process in step S55.

The processes in steps S53 through S55 are performed on all add-in tools existing in the system directory of the personal computer. After the processes have been completed on all add-in tools, control is passed from step S53 to step S56, and the add-in tool main program contained in the directory of the application and the related files are removed, thereby terminating the process.

FIGS. 11 through 13 show the contents of the files provided on the user 10 side shown in FIG. 4. FIG. 11 shows the contents of the file 51 for storing the user personal information. The user personal information as the contents of the file is stored in the file 51 by user's inputting when a software product is registered for use. When another software is registered for use, the contents are used for the registration, thereby preventing the user from re-inputting the same contents.

FIG. 12 shows the contents of the file 52 for storing software registration information. In the stored contents, a software code is represented by coding the name of a software product and a version level. A serial number corresponds to a production number, and is assigned to each software code by the software vendor. When a software is registered for use, the serial number of software, purchased by a user, is unknown to the vendor, and the user has to input the serial number as part of registration information.

A user registration number is assigned for each software code on the user registration centre 13 side as described above. Simultaneously, a number is assigned in a format in which the software vendor product can be identified. Using status data is a number of times of starting up of the software product according to the present embodiment.

A requested information type is specified by a user when a software product is registered, and indicates the type of the latest information requested by the user. For example, a type A refers to enhancement information about new product information, version-up information, etc. A type B refers to information about products for use in combination among the products of the same vendor, information about convenient functions. A type C refers to linkage information used when a software product is linked with another vendor software product and hardware product.

FIG. 13 shows the contents of the file 53 for storing the information from a software vendor. The contents are the latest information transmitted from the user registration centre 13 in response to the request from the user, and includes a user registration number assigned for each software code.

FIGS. 14 through 16 show the contents of the master databases 54 through 56 provided in the user registration centre 13 shown in FIG. 4. FIG. 14 shows the contents of the master database 54 for storing the user personal information. The master database 54 stores the contents of the user personal information file 51 for storing the personal information about the user shown in FIG. 11, and the user registration number assigned in the user registration centre 13.

FIG. 15 shows the contents of the master database 55 for storing the software registration information. The registration information as the contents shown in FIG. 15 are similar to those described above. Additionally, the database stores the number of times the user has obtained the information about the software product.

FIG. 16 shows the contents of the master database 56 for storing the information from the vendor. In FIG. 16, the start and the end of the display indicate the display period under the information extraction condition, that is, the effective display period of the vendor information. The related software code is one of the extraction condition, and is provided by another vendor corresponding to the above described information type C.

FIGS. 17 through 25 show examples of the screens displayed during the process performed on the user side shown in the user registration process flowchart of the software product shown in FIG. 6. FIG. 17 shows a screen indicating the starting up of the software registration/reference tool. On the screens, the user selects any of new registration, change of registration, and obtaining the latest information using a mouse. The 'NAME OF FORM' indicating the contents of the screen process refers to one screen.

FIG. 18 shows an input screen of the software registration information. In FIG. 18, the information received from the body of the software, that is, the name of the vendor (provider), the name of the software, a version number, etc.

are displayed. The information not obtained from the body of the software, that is, the serial number in this example, is input by the user.

FIG. 19 shows the software registration information check screen. In this example, the registration information obtained from the body of the software and the information input by the user can be checked.

FIGS. 20 and 21 show an input screen of user information, that is, the personal information about the user. In FIG. 20, the user specifies a person or a corporation, and inputs the name of the specified person or corporation. In FIG. 21, a post code, an address, a telephone number, etc. are input.

FIG. 22 shows the check screen of the user information, that is, the personal information about a user. The input personal information is checked.

FIG. 23 shows the registration starting screen. When the user makes a registration, communications start to make an online registration by setting communications environment, or pushing a dial illustrated button in the drawing. When the cancel button is pushed, no registration is made. Thus, according to the present embodiment, no registration is made when the user does not request the registration. That is, the registration is made only at the request of the user. When the user does not request the registration, that is, cancels the registration, an indication to recommend the registration process is displayed when the software product is started from the next time on.

FIG. 24 shows the screen of the communications in process, that is, the screen on which the online registration is performed. As described in the remarks column, the process meter indicates to what extent the communications have proceeded from the initialization of the port to the disconnection of the line.

FIG. 25 shows an example of the screen informing that the user registration has been completed, and the user registration number is displayed in the window. The remarks column indicates the amount of information as registration information.

FIGS. 26 through 28 show an example of the screen on the user side in the latest information reference process shown in FIG. 7. In this case, the registration/reference tool is started in step S23 shown in FIG. 7, the screen showing the start up of the registration/reference tool shown in FIG. 17 is displayed, and 'obtaining latest information' is selected by clicking the mouse. Thus, the screen on which the latest information obtaining process is checked is displayed as shown in FIG. 26. In FIG. 26, cancel is acceptable. If the user does not request the latest information, the information is not referred to and the recommendation of the reference process is displayed from the next process on.

FIG. 27 shows the screen displaying the communications process being performed. On this screen, the process meter indicates to what extent the communications have proceeded from the initialization of the port to the disconnection of the line.

FIG. 28 shows an example of the screen informing that the latest information has been obtained. The screen displays the latest information, that is, the latest information from the vendor. When the termination button is pressed, the latest information reference process terminates. The remarks column indicates the amount of the latest information.

In the explanation above, the user management and service system is described by referring to a software product in computer-related products. However, the present invention is not limited to the software product, but can be applied to a user management and service for hardware including peripherals. Furthermore, among the processes performed by the system, the new registration process and the latest information reference process are described in explaining the operations of the system. However, the types of the processes and the aspects of the processes are not limited to the descriptions of the preferred embodiments above. That is, various processes can be performed in various formats.

As described in detail above, the user can make user registration for a computer-related product in a simple procedure and receive various after-services from a vendor on an online network without delay. The computer-related products vendor can easily acquire the using status information of a product at a low cost, and reduce a cost for user registration and user services. Furthermore, various information services can be provided for each user and therefore attract a large number of users. Additionally, value-added business can be realized through user registration information, thereby contributing a lot to the development of the entire computer industry.

What is claimed is:

1. A computer implemented management system, which manages registration of computer-related products, including hardware and software products, comprising:
   user information general management means for generally managing user registration information, about users of hardware and software products, and using status information thereof transmitted from the user;
   user registration/reference means that interfaces with the users, for notifying said user information general management means of the user registration information and the using status information at a request of the user and the using status information; and
   vendor registration/reference means for receiving the user registration information and the using status information from said user information general management means and for providing new information about computer-related products to said user information general management means,
   wherein the user registration information includes personal information about each user containing an identification number of each user and registration information containing a type of information which is requested by the users with regard to the computer-related products, said type of information can include information about products which can be used in combination with products that are used by the users and available from a plurality of vendors, and said type of information further signifies a difference in vendor of said products that can be used in combination with products that are used by the user, in terms of whether the vendor is the same as the vendor of the products that are used by the user, and
   the new information provided from said vendor registration/reference means about the computer-related products from a vendor side of the computer-related products is extracted, depending on information extraction condition containing a requested information type in the registration information, and is transmitted to said user registration/reference means from said user information general management means to provide the new information, and
   the user registration information and the using status information, including a number of times a particular software product is used by the user, is transmitted from the user information general management means to the vendor registration/reference means of a vendor of the particular software product and to another vendor that sells products that may be of interest to users of the particular software product.

2. The system according to claim 1, wherein said user registration/reference means requests at a request from the user said user information general management means to provide new information about the computer-related product from a vendor of the computer-related product.

3. The system according to claim 1, wherein the computer-related product is a software product, and said user registration/reference means is common to each of a plurality of software products;
when any of the plurality of software products is installed by a user, the user registration/reference means is also installed; and
after installation, said user registration/reference means issues a notification about the user registration information and using status information for the plurality of software products which are installed, and submits a request for new information about the software product.

4. The system according to claim 1, wherein said user registration information comprises:
personal information about each user including an identification number of each user; and
registration information containing a type of information requested by the user about a computer-related product; and
said user information general management means extracts the new information depending on information extraction condition containing a requested information type in the registration information at a request for new information about a computer-related product from said user registration/reference means, and transmits the new information to said user registration/reference means.

5. The system according to claim 1, wherein the computer-related product is a software product and the using status information contains the number of times the software product was started; and
said user information general management means transmits new information about the software product to said user registration/reference means depending on the number of times the software product was started.

6. The system according to claim 1, wherein the computer-related product is a software product and the using status information contains the number of times the software product was started; and
said user registration/reference means requests said user information general management means to provide new information about the software product when the number of times the software product was started has reached a predetermined value.

7. The system according to claim 1, wherein said vendor registration/reference means specifies a type of new information when new information about the computer-related product is available; and
said user information general management means compares the type of information requested by the user with the type specified by said vendor registration/reference means, and when both types coincide, transmits the new information to said user registration/reference means at a request from said user registration/reference means when the requested information is available.

8. A management apparatus which manages user information about a computer-related product used by a user terminal connected through a network, comprising:

a user information general management means for managing using status information and a requested information type provided by the user terminal about a product used by a user;
a product information management means for managing product information provided by a vendor of the computer-related product including product information about additional products that can be used with a particular product; and
a product information notification means for referring to a product used by each user managed by said user information general management means and for providing product information managed by said product information management means about a product used by a user which corresponds to the products available from a plurality of vendors that can be used with the product used by the user and match the user's requested information type, wherein said requested information type further signifies a difference in vendor of said products that can be used in combination with products that are used by the user, in terms of whether the vendor is the same or not with the vendor of the products that are used by the user, and
the using status information, including a number of times a particular software product is used by the user, is transmitted from the user information general management means to a different vendor other than the software product's vendor, that sells products that may be of interest to users of the particular software product.

9. A computer-readable storage medium encoded with software to cause a computer to perform a process comprising:
managing using status information and a requested information type provided by a user terminal about a product used by a user;
managing product information provided by a computer-related product vendor including product information about additional products available from a plurality of vendors that can be used with a particular product, wherein said requested information type further signifies a difference in vendor of said products that can be used in combination with products that are used by the user, in terms of whether the vendor is the same or not with the vendor of the products that are used by the user;
referring to the using status information and providing product information about additional products that can be used with the product used by a user and which corresponds to the requested information type at a product information request from the user terminal; and
transmitting the using status information, including a number of times a particular software product is used by the user, to a different vendor other than the software product's vendor, that sells products that may be of interest to users of the particular software product.

10. A user terminal apparatus comprising:
a user information notification means for notifying an external unit of user registration information and using status information including a product used by a user and a requested information type about the computer-related product; and
a product information reference means for requesting an external unit for new information about the computer-related product which corresponds to the requested information type from a computer-related product vendor and information on additional products available from a plurality of vendors that can be used with the product used by the user, and said requested information type further signifies a difference in vendor of said products that can be used in combination with products that are used by the user, in terms of whether the vendor is the same or not with the vendor of the products that are used by the user, a using status transmitting means transmitting the using status information, including a number of times a particular software product is used by the user, to a different vendor other than the software product's vendor, that sells products that may be of interest to users of the particular software product.

11. A computer-readable storage medium encoded with software for causing a computer to perform a process comprising:

notifying an external unit of user registration information and using status information including a product used by a user and a requested information type about a computer-related product used by a user; and requesting an external unit for new information about the computer-related product which corresponds to the requested information type from a vendor of the computer-related product and information on additional products available from a plurality of vendors that can be used with the product used by the user, and said requested information type further signifies a difference in vendor of said products that can be used in combination with products that are used by the user, in terms of whether the vendor is the same or not with the vendor of the products that are used by the user, transmitting the using status information, including a number of times a particular software product is used by the user, to a different vendor other than the software product's vendor, that sells products that may be of interest to users of the particular software product.

12. A terminal apparatus of a vendor comprising:

a user information reference means for obtaining, from an external unit, user registration information including a requested information type and using status information including a product used by the user, transmitted from a user of a computer-related product; and a product information notification means for notifying an external unit of new information about the computer-related product, if the new information about the computer-related product corresponds to the requested information type, the new information including additional products of the vendor itself that can be used with the product used by the user, and said requested information type further signifies a difference in vendor of said products that can be used in combination with products that are used by the user, in terms of whether the vendor is the same or not with the vendor of the products that are used by the user, a using status information receiving means receiving the using status information, including a number of times a particular software product is used by the user, wherein, the terminal apparatus can use the user registration information and the using status information from a user of a product of a different vendor rather than the vendor itself, that sells products that may be of interest to users of the particular software product.

13. A computer-readable storage medium encoded with software to cause a computer of a vendor to perform a process comprising:

obtaining, from an external unit, user registration information including a requested information type, and using status information about usage of a product by a user, transmitted from the user of a computer-related product;

notifying an external unit of new information about the computer-related product, if the new information about the computer-related product corresponds to the requested information type, the new information including additional products of the vendor itself that can be used with the product used by the user, and said requested information type further signifies a difference in vendor of said products that can be used in combination with products that are used by the user, in terms of whether the vendor is the same or not with the vendor of the products that are used by the user; and receiving the using status information, including a number of times a particular software product is used by the user, wherein, the computer-readable storage medium is used by a computer that can use the user registration information and the using status information from a user of a product of a different vendor rather than the vendor itself, that sells products that may be of interest to users of the particular software product.

14. A computer implemented management system, which manages registration of computer-related products, comprising:

a user information general management module generally managing user registration information including a requested information type, and using status information including a product used by a user, transmitted from a user of the computer-related product; and a user registration/reference module that interfaces with a user of the computer-related products notifying said user information general management module of the user registration information and the using status information and information about additional products available from a plurality of vendors that can be used with the product used by the user at a request of the user who uses a computer-related product related to the user registration information and the using status information and which corresponds to the requested information type, wherein said requested information type further signifies a difference in vendor of said products that can be used in combination with products that are used by the user, in terms of whether the vendor is the same or not with the vendor of the products that are used by the user;

a using status information module transmitting the using status information, also including a number of times a particular software product is used by the user, to a different vendor other than the software product's vendor, that sells products that may be of interest to users of the particular software product; and a vendor registration/reference module receiving the user registration information and the using status information from said user information general management module and providing new information about computer-related products to said user information general management module.

15. The system according to claim 14, wherein the computer-related product is a software product, and said user registration/reference module is common to each of a plurality of software products;

when any of the plurality of software products is installed by a user, the user registration/reference module is also installed; and after installation, said user registration/reference means issues a notification about the user registration information and using status information for the plurality of software products which are installed, and submits a request for new information about the software product.

16. A user registration center managing and distributing information provided by both a user and a vendor comprising:
   a database receiving, from the vendor product information about a product and additional product information about additional products that can be used with the product;
   the database receiving, from the user, user information which includes a product used by the user and a requested information type from the user; and
   a distributing module, automatically distributing to the user, additional product information corresponding to the additional products available from a plurality of vendors that can be used with the product used by the user and which match the user's requested information type, wherein said requested information type further signifies a difference in vendor of said products that can be used in combination with products that are used by the user, in terms of whether the vendor is the same or not with the vendor of the products that are used by the user,
   a using status information module transmitting the user information, also including a number of times a particular software product is used by the user, to a different vendor other than the software product's vendor, that sells products that may be of interest to users of the particular software product.

17. A method of managing and distributing information provided by both a user and a vendor, comprising:
   receiving, from the vendor, product information about a product and additional product information about additional products that can be used with the product;
   receiving, from the user, user information which includes a product used by the user and a requested information type from the user;
   storing the product information about a product and additional product information about products available from a plurality of vendors that can be used with the product and the user information which includes a product used by the user and the requested information type from the user, all in a database, wherein said requested information type further signifies a difference in vendor of said products that can be used in combination with products that are used by the user, in terms of whether the vendor is the same or not with the vendor of the products that are used by the user;
   distributing the additional product information to a user automatically corresponding to the additional products that can be used with the product used by the user and which match the user's requested information type; and
   distributing the user information, also comprising a number of times a particular software product is used by the user, to a different vendor other than the software product's vendor, that sells products that may be of interest to users of the particular software product.

18. The additional product information distributed to the user as claimed in claim 16, wherein said additional product information distributed to the user includes a plurality of product information correlating to products used by the user as indicated by the user information.

\* \* \* \* \*